(12) United States Patent
Weitzenhof (10) Patent No.: US 6,474,630 B1
(45) Date of Patent: Nov. 5, 2002

(54) AIR SPRING SWAGE ASSEMBLY

(75) Inventor: David A. Weitzenhof, Bath, OH (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 09/841,342

(22) Filed: Apr. 24, 2001

(51) Int. Cl.$^7$ .................. F16F 9/04; F16F 5/00
(52) U.S. Cl. .................. 267/64.27; 267/64.24; 267/122
(58) Field of Search .................. 267/64.11, 64.19, 267/64.21, 64.23, 64.24, 64.27, 122; 403/50, 51, 225, 226, 227, 228

(56) References Cited

U.S. PATENT DOCUMENTS

| | | | |
|---|---|---|---|
| 3,788,628 A | * | 1/1974 | Hotz, Jr. et al. ......... 267/64.24 |
| 4,378,935 A | | 4/1983 | Brown et al. |
| 4,489,474 A | | 12/1984 | Brown et al. |
| 4,564,177 A | * | 1/1986 | Leonard .................. 267/64.24 |
| 4,657,229 A | | 4/1987 | Thurow |
| 4,784,376 A | | 11/1988 | Ecktman |
| 4,787,606 A | | 11/1988 | Geno et al. |
| 4,787,607 A | | 11/1988 | Geno et al. |
| 4,852,861 A | | 8/1989 | Harris |
| 4,899,995 A | | 2/1990 | Hoffman et al. |
| 4,946,144 A | | 8/1990 | Geno et al. |
| 5,005,808 A | | 4/1991 | Warmuth, II et al. |
| 5,267,725 A | * | 12/1993 | Wode et al. .............. 267/64.27 |
| 5,374,037 A | * | 12/1994 | Bledsoe .................. 267/64.27 |
| 5,460,354 A | | 10/1995 | Easter |
| 5,941,509 A | | 8/1999 | Avesian et al. |
| 6,036,180 A | | 3/2000 | Ecktman |

* cited by examiner

Primary Examiner—Jack Lavinder
Assistant Examiner—Thomas J. Williams
(74) Attorney, Agent, or Firm—John M. Vasuta; Michael Sand; Fred H. Zollinger, III (57) ABSTRACT

An air spring has a pair of axially spaced end members and an intervening elastomeric flexible sleeve extending therebetween which forms a fluid pressure chamber. A plurality of axially spaced ribs and intervening grooves are formed on an inner surface of a ring which align with corresponding ribs and grooves formed on an axial sealing surface of one of the end members to form a fluid tight seal with the elastomeric sleeve clamped therebetween. An annular radially extending projection is formed on each of the ring and end member which cooperatively mate with each other to provide a mechanical interlock therebetween which is free of intervening elastomeric material, to securely retain the ring in position with respect to the end member sealing surface.

13 Claims, 6 Drawing Sheets

AIR SPRING SWAGE ASSEMBLY

BACKGROUND OF THE INVENTION

1. Technical Field

The invention relates to air springs and more particularly, to a swage assembly for sealingly clamping and affixing a resilient elastomeric sleeve member to an end member of the air spring. Even more particularly, the invention relates to a swage assembly which provides for a mechanical interlock between the swage ring and end member to positively locate the swage ring on the end member and to effectively seal the open end of the elastomeric sleeve therebetween.

2. Background Information

Pneumatic springs commonly referred to as air springs, have been used for many applications, including motor vehicles, for a number of years to provide cushioning between moveable parts of the vehicle, primarily to absorb shock loads impressed on the vehicle axles by the wheels striking an object in the road or falling into a depression. The air spring usually consists of a flexible rubber sleeve or bellows containing a supply of compressible fluid and has one or more pistons movable with respect to the flexible sleeve. The piston causes compression and expansion of the fluid within the sleeve as the sleeve compresses and tends as the vehicle experiences road perturbations. The spring sleeve is formed of a flexible elastomeric material, usually containing reinforcing cords, and permits the piston to move axially with respect to another piston or end cap secured within opposed open ends of the sleeve.

The open ends of the sleeves are sealingly connected to the piston and/or opposite end cap, and the integrity of this connection is always one of the important and major aspects in producing an efficient and maintenance-free air spring. Another problem with existing air springs and in particular, the swage ring therefore, is that the swage ring will move in its clamped position under dynamic air spring conditions causing movement of the clamped elastomeric material therebetween tending to loosen the sealing engagement and deteriorating the swage integrity and causing ultimate air spring leakage and failure. This ring movement is especially critical during either extreme of rebound or jounce.

Another problem with existing air springs and the swaging of the elastomeric sleeve ends to the piston member and/or end cap is to achieve a sufficiently tight seal which is able to withstand high fluid pressures contained in the fluid chamber without premature leakage or bursting even upon experiencing severe air spring movement and being exposed to the harsh environments on the undercarriage of a vehicle.

Some examples of air springs and ring sealing devices are shown in U.S. Pat. Nos. 3,788,628, 3,870,286, 4,489,474, 4,573,692, 4,629,170, 4,718,650, 4,784,376, 4,787,607, and 4,787,606.

Other prior art air spring constructions include radially extending shoulders formed on the piston member on which the clamping ring seats and sealingly clamps the cut end of the flexible sleeve against a plurality of uniformly raised ribs formed on the axially extending sealing surface of the piston member adjacent the annular shoulder. However, such constructions present problems in that the clamp ring is not positively positioned on the annular shoulder, and is free to move in an upward axial direction upon the air spring experiencing severe jounce or extended positioning.

Many of the problems discussed above are solved by the clamping arrangement shown in U.S. Pat. Nos. 4,899,995, 4,852,861 and 5,374,037. These patents show the use of a clamp ring having recesses which align with outwardly extending projections formed on the sealing surface of the piston and/or end member in order to position the ring on the piston or end member. Although such clamp ring assemblies do solve many of the problems discussed above and are extremely efficient for many applications, it has been found that for certain air spring applications, especially for larger air springs having high internal pressure, it may not provide the necessary clamping and ring retention.

Therefore, the need exists for a further improved swage ring assembly for air springs which provides increased clamping and sealing at one or both of the open ends of the elastomeric member between the swage ring and end cap and/or piston, and which firmly secures the ring in position to prevent axial movement thereof.

SUMMARY OF THE INVENTION

The present invention provides an improved swage ring assembly for air springs, primarily used for motor vehicles, having a piston at one end and an end cap at an axially spaced opposite end, with a flexible elastomeric sleeve extending therebetween and clamped against the respective end cap and piston member by swage rings to form a fluid tight seal therebetween and provide an intervening pressure chamber.

Another feature of the invention is to provide a swage ring assembly in which axial movement of the swage ring is reduced and/or eliminated when operating under dynamic conditions by providing one or both of the swage rings and end members with cooperating annular projections and aligned recesses which provide a positive mechanical interlock between the swage rings and end members free of intervening elastomeric material, to prevent movement therebetween, and maintaining a positive sealing engagement for the elastomeric sleeve swaged therebetween.

A further feature of the invention is that the piston and/or end cap have clamping surfaces formed with a plurality of annular ribs and intervening grooves which act in cooperation with a corresponding number of ribs and grooves formed on the swage ring to facilitate efficient gripping of the elastomeric sleeve therebetween and to alter the direction of the reinforcing cords contained within the sleeve to further increase the clamping effect of the ring, and which assists in locating the swage ring on the sealing surface of the piston member and/or end cap.

Another feature of the swage ring assembly is that the outer surface of the swage ring generally aligns with an adjacent outer surface of the piston or end cap to provide a generally continuous smooth surface between the swage ring and piston or end cap over which the elastomeric sleeve rolls, to provide a smooth interface therebetween to reduce wear on the elastomeric sleeve as it moves along the surfaces of the piston or end cap and swaging ring during dynamic operation of the air spring.

Preferably the swage ring is symmetrical about its center axis enabling it to be mounted on the selected end member without regard to its up or down orientation on the end member; and in which the ribs, grooves and locking projections on the piston and end cap are similar to that of the swage ring, enabling the swage ring cross-section to be used interchangeably on either of the end members.

The swage ring preferably is metal enabling it to be swaged on either of the end members assuming the end members have the same diameters, which members can be metal, a high strength plastic or similar material.

The foregoing advantages, construction and operation of the present invention will become more readily apparent from the following description and accompanying drawings.

BRIEF DESCRIPTION OF THE DRAWINGS

Similar numbers refer to similar parts throughout the drawings.

DESCRIPTION OF THE PREFERRED EMBODIMENTS

Figure 1:
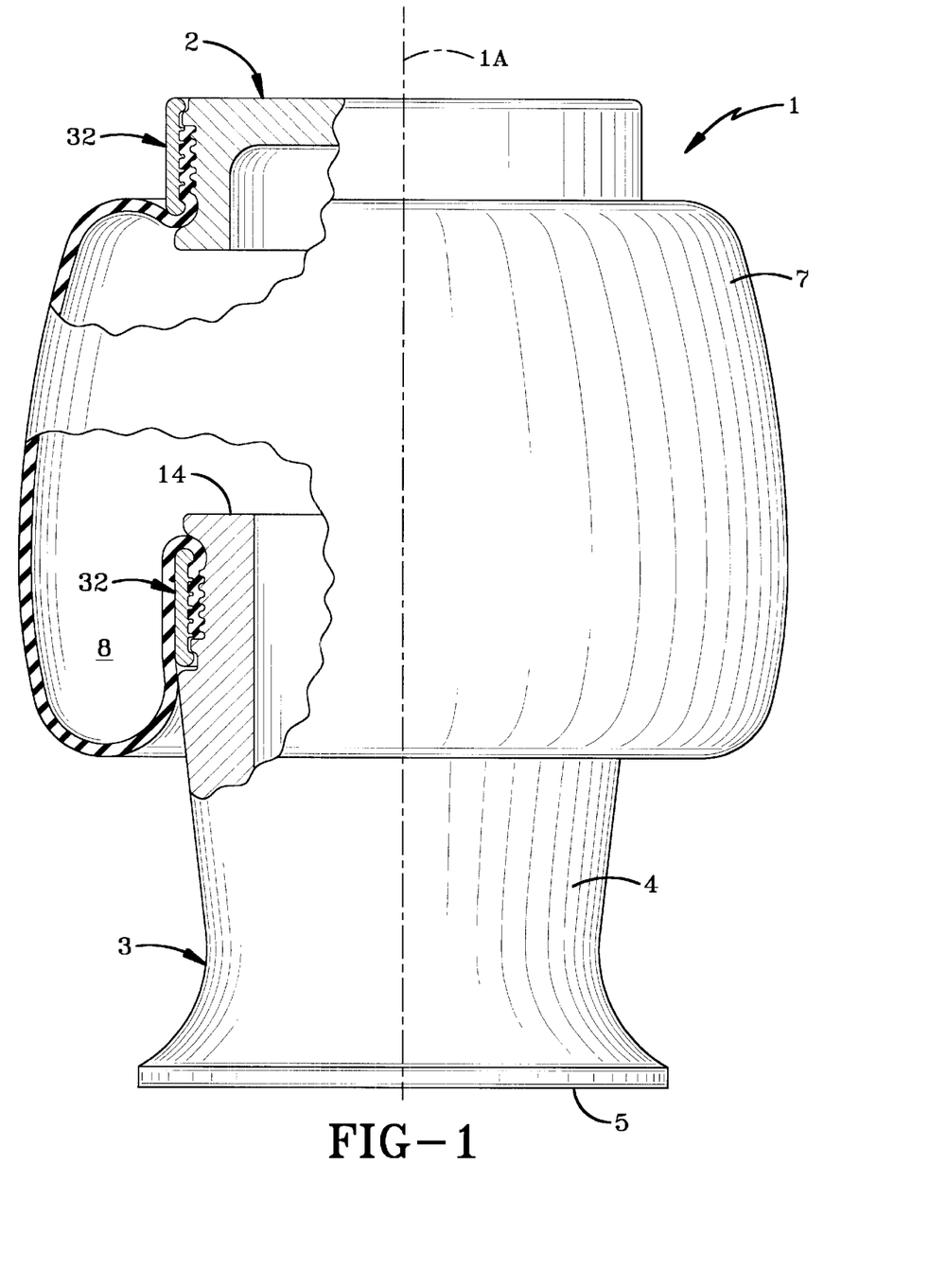
FIG. 1 is an elevational view of the improved swage ring assembly incorporated into an air spring, with portions of the air spring being broken away and in section, and shown in a static at-rest position.

Two of the improved swage ring assemblies of the invention are shown in FIG. 1 mounted on an air spring, indicated generally at 1, which is shown in an at-rest position. Air spring 1 has a longitudinal axis 1A and includes two axially spaced end members consisting of an end cap and a piston, indicated generally at 2 and 3 respectively. Piston 3 may have various configurations, with that shown in the drawings being an example of one type. Piston 3 is cup-shaped having a generally conical shaped outer wall 4 termination in a flat base 5 which is adapted to be mounted on a spaced component of a vehicle or other type of equipment. A flexible sleeve 7 formed of elastomeric material and preferably containing internal reinforcing cords 9 (FIGS. 2 and 3), extends axially between end cap 2 and piston member 3 which are clampingly engaged within the open ends of the sleeve by the swage ring assembly of the invention, in order to form a fluid pressure chamber 8 therebetween.

Figure 2:
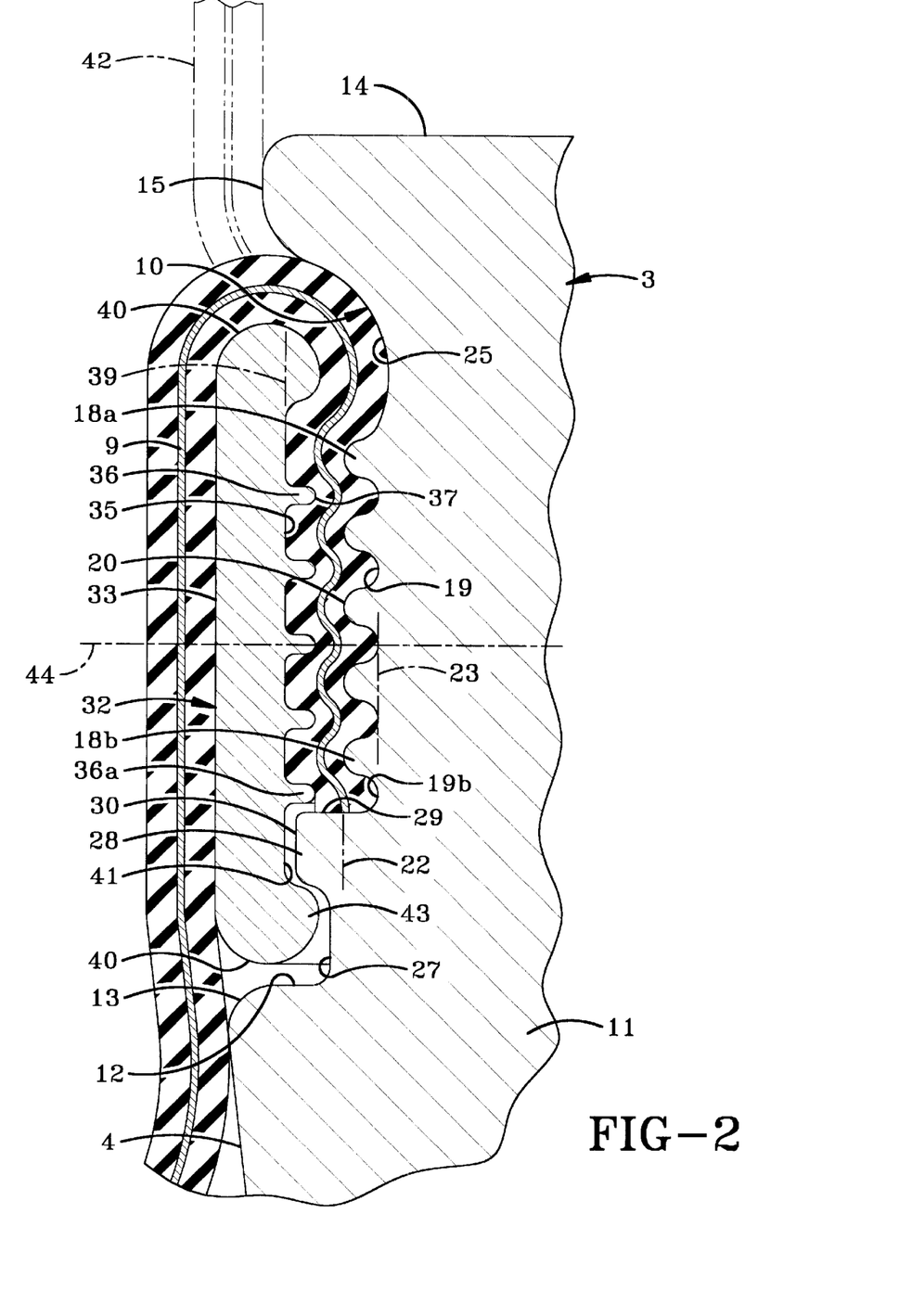
FIG. 2 is a greatly enlarged fragmentary sectional view showing the swage ring assembly securing one end of the elastomeric sleeve against the sealing surface of the piston.

An axially extending clamping surface indicated generally at 10, is formed on a reduced diameter upper end portion 11 of piston member 3, shown in FIG. 2. Clamping surface 10 is connected to conical outer wall 4 of the piston by a radially extending shoulder 12 and a curved corner 13. The open outer end of piston end portion 11 has a radially extending flat surface 14 which terminates in a radially extending smoothly curved outer lip 15.

Clamping surface 10 includes a plurality of axially spaced annular ribs 18, five of which are shown in the drawings, and four intervening grooves 19. Ribs 18 terminate in smoothly curved outer ends 20 which are in axial alignment with each other as shown by dashed line 22. Likewise, the roots of grooves 19 also are axially aligned with each other as shown by dashed line 23. Uppermost rib 18a merges into annular lip 15 by a smooth inwardly curved enlarged concave recess 25.

In accordance with one of the features of the invention, corner 13 and shoulder 12 form an annular recess 27 adjacent a radially outwardly extending annular projection 28 which merges into lowermost groove 19b by a flat radially extending shoulder 29. Projection 28 preferably has a relatively flat axially extending outer end surface 30.

Figure 3:
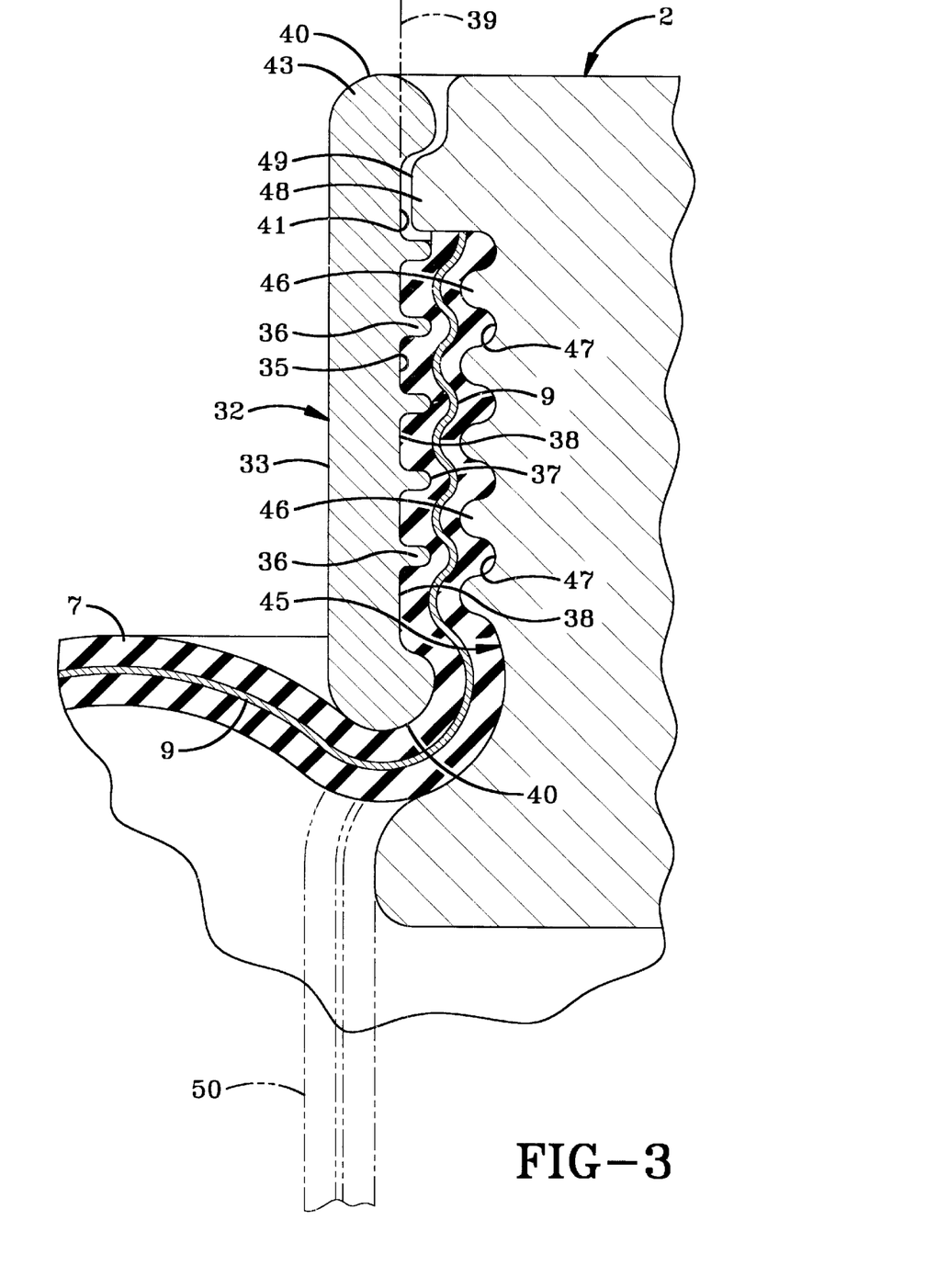
FIG. 3 is a greatly enlarged fragmentary sectional view similar to FIG. 2, showing the swage ring assembly securing another end of the elastomeric sleeve against the sealing surface of the end cap.
Figure 4:
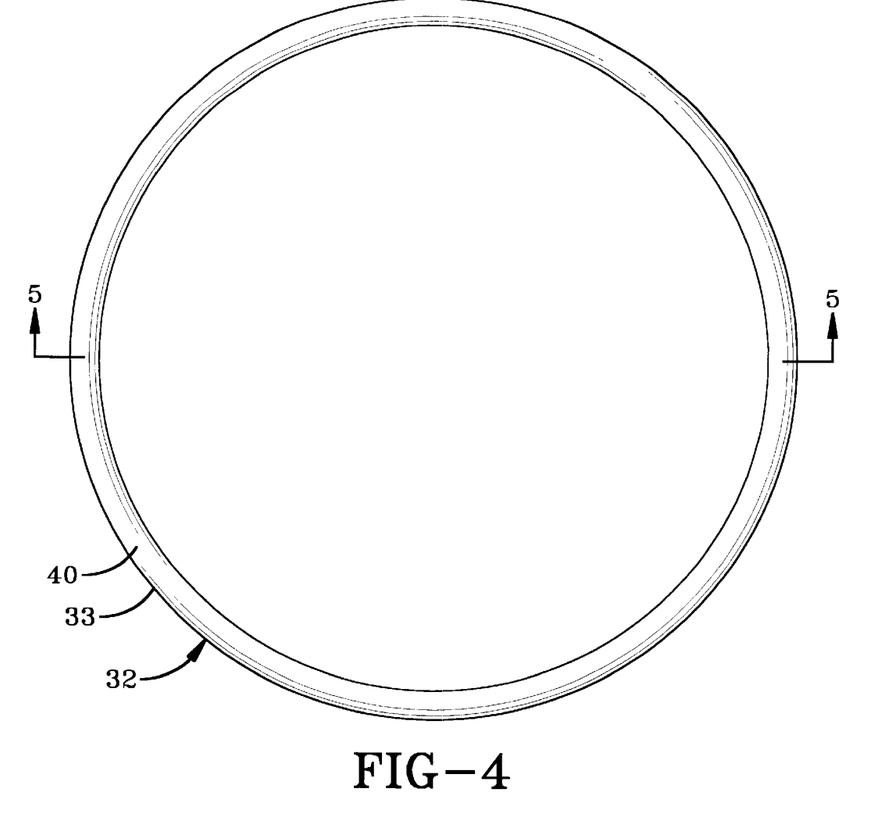
FIG. 4 is a top plan view of the swage ring portion of the swage assembly.
Figure 5:
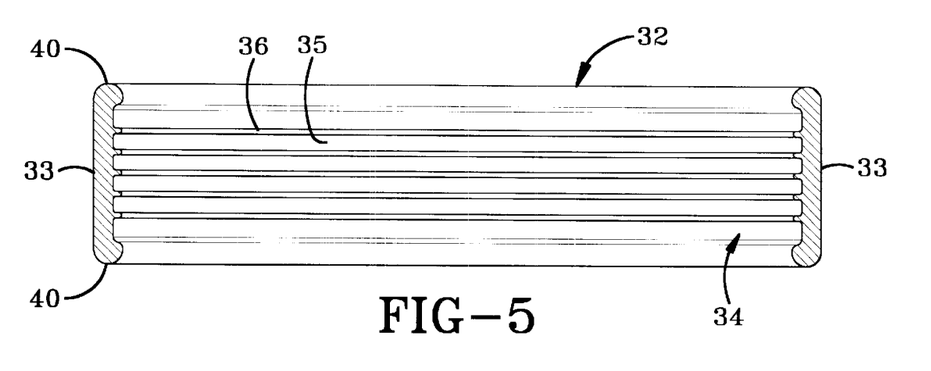
FIG. 5 is a sectional view of the swage ring taken along line 5—5, FIG. 4.

The swage ring assembly further includes a swage ring indicated generally at 32 (FIGS. 4 and 5), preferably formed of aluminum or other metal enabling it to be swaged against clamping surface 10. Ring 32 has a flat outer axially extending surface 33 and an inner sealing surface 34. Inner surface 34 has a plurality of axially spaced grooves 35 and intervening radially inwardly extending ribs 36 which terminate in smoothly curved outer ends 37. Grooves 35 may have flat inner surfaces or roots 38 as shown in FIG. 3, or curved concave configurations. Roots 38 are axially aligned with each other as shown by dashed line 39. Outer and inner surfaces 33 and 34 of swage ring 32 terminate in smoothly curved outer ends 40.

As shown in FIG. 2, ribs 18 of clamping surface 10 radially aligns with grooves 35 of swage ring 32 and correspondingly ribs 36 of swage ring 32 radially align with grooves 19 of clamping surface 10. This relationship squeezes elastomeric material of sleeve 7 therebetween causing reinforcing cord 9 to take a sinuous route therebetween. Swage ring 32 preferably is tightly swaged by mechanical deformation towards clamping surface 10 to sealingly retain and squeeze the open end of elastomeric sleeve 7 therebetween providing for a fluid tight seal.

In accordance with another feature of the invention, projection 28 of piston 2 extends into an enlarged annular recess 41 formed in an end portion of swage ring 32 (FIG. 2) and matingly engages an annular end projection 43 formed at the end of ring 32 to provide for a positive mechanical interlock between ring 32 and piston 3, which interlock is free of any intervening elastomeric material. This mechanical interlock positions swage ring 32 on sealing surface 10 of piston 3 so that the ribs and opposite grooves align with each other. Most importantly, this interlock prevents axial movement of the swage ring with respect to sealing surface 10 when the end cap and piston move axially apart a significant amount causing sleeve 7 to assume the dashed position indicated at 42, which heretofore would attempt to pull swage ring 32 upwardly harmfully affecting the seal created between the swage ring and piston.

As shown in FIG. 2, the mechanical interlock provided by projections 28 and 43 prevents axial movement of the swage ring with respect to the piston enabling the airtight clamping engagement achieved by the cooperating ribs and grooves to be maintained. Likewise, when sleeve 7 is in this highly extended position shown by dashed line 42, annular lip 15 provides for a smooth curved surface along which the elastomeric sleeve moves to prevent any damage to the sleeve. Also, when air spring 1 is in its normal at-rest position, smooth corner 13 merges into smooth outer conical outer wall 4 of the piston to provide for a smooth generally continuous surface to prevent damage to sleeve 7. Swage ring 32 also is prevented from moving axially downwardly toward shoulder 12 by the engagement of the lowermost rib 36a with projection 28. Swage ring 32 preferably is symmetrical with respect to its center axis 44, that is, it has a projection 43 and a recess 41 formed adjacent both ends, and has the same number of ribs and recesses equally spaced on each side of axis 44. This enables swage ring 32 to be placed on piston 3 and end cap 2 as described below, without regard to orientation of a top or bottom end surface, preventing improper installation.

Referring to FIG. 3, swage ring 32 is shown securing another open end of elastomeric sleeve 7 against an annular axially extending sealing surface 45 of end cap 2. Sealing surface 45 is formed with a plurality of axially spaced radially outwardly extending ribs 46 and intervening grooves 47, which preferably are similar to ribs 26 and grooves 19 respectively, of piston sealing surface 10. The relationship between the swage ring ribs and aligned grooves 47 are similar to that described above with respect to piston 3. Furthermore, end cap 2 will have an annular radially outwardly extending projection 48, preferably having a flat outer surface 49, which extends into recess 41 formed adjacent the end of swage ring 32, and together with locking projection 43 of ring 32, provides for the same mechanical interlock between swage ring 32 and end cap 2, free of any intervening elastomeric material, as described above with respect to piston 2. This mechanical interlock prevents axial movement of the swage ring along end cap sealing surface 45, especially when an extreme axial separation occurs between end cap 2 and piston 3 wherein sleeve 7 will attempt to pull outwardly from beneath the swage ring as shown by dashed lines 50. Again, this mechanical interlock assists in positioning the swage ring and in particular the ribs thereof, in proper alignment with the radially opposite grooves 47 of the end cap sealing surface, and visa versa, to positively retain and position the swage ring on end cap 2 and maintain the fluid tight sealing engagement therebetween provided by the mating ribs and recesses. Again, reinforcing cords 9 will assume a generally sinuous path through the clamping zone to assist in retaining the open end of the elastomeric sleeve clamped therein when subjected to high internal pressure and excessive axial separation between the two end members.

Figure 6:
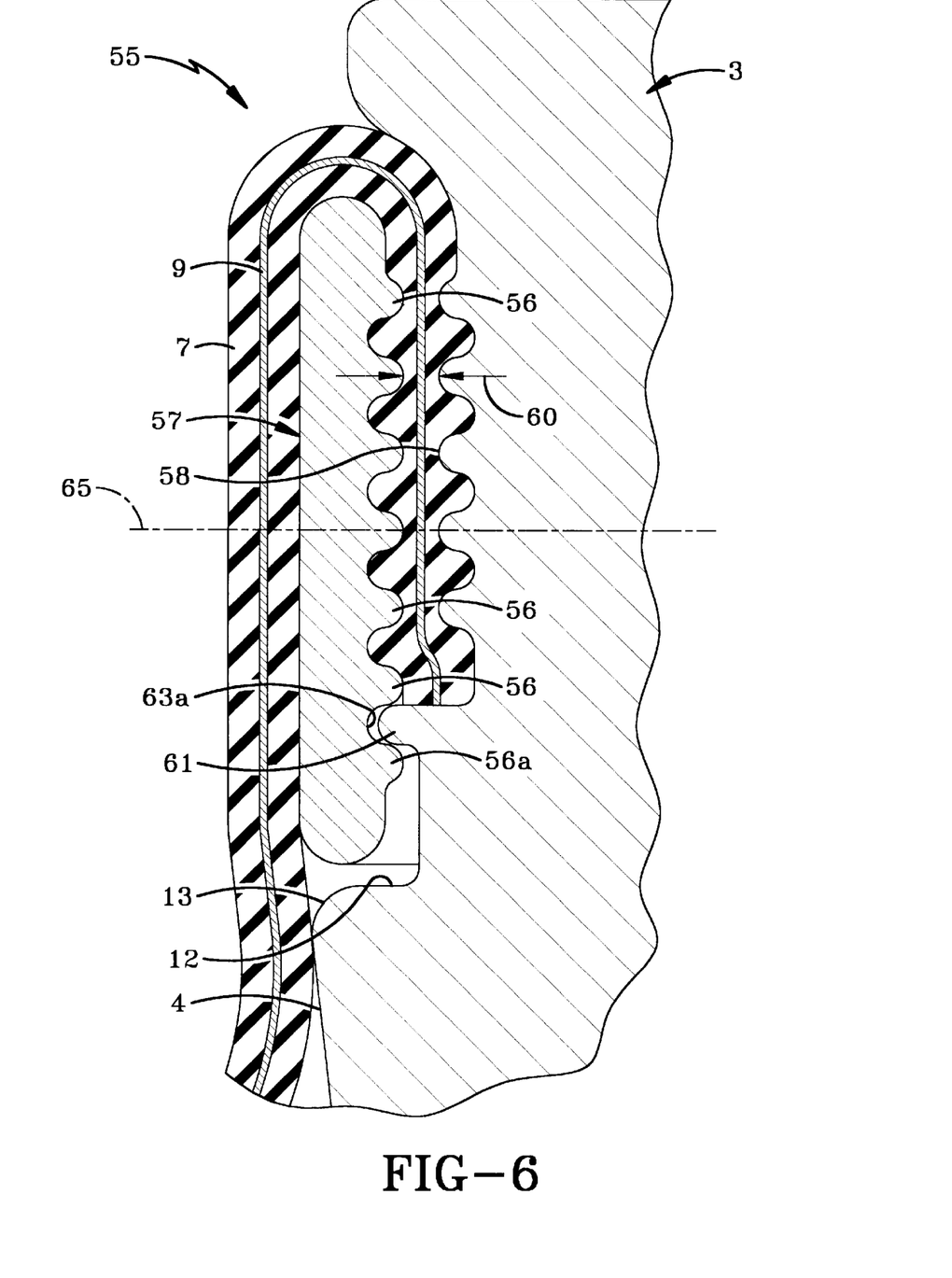
FIG. 6 is a view similar to FIG. 2 showing a modified swage ring assembly.
Figure 7:
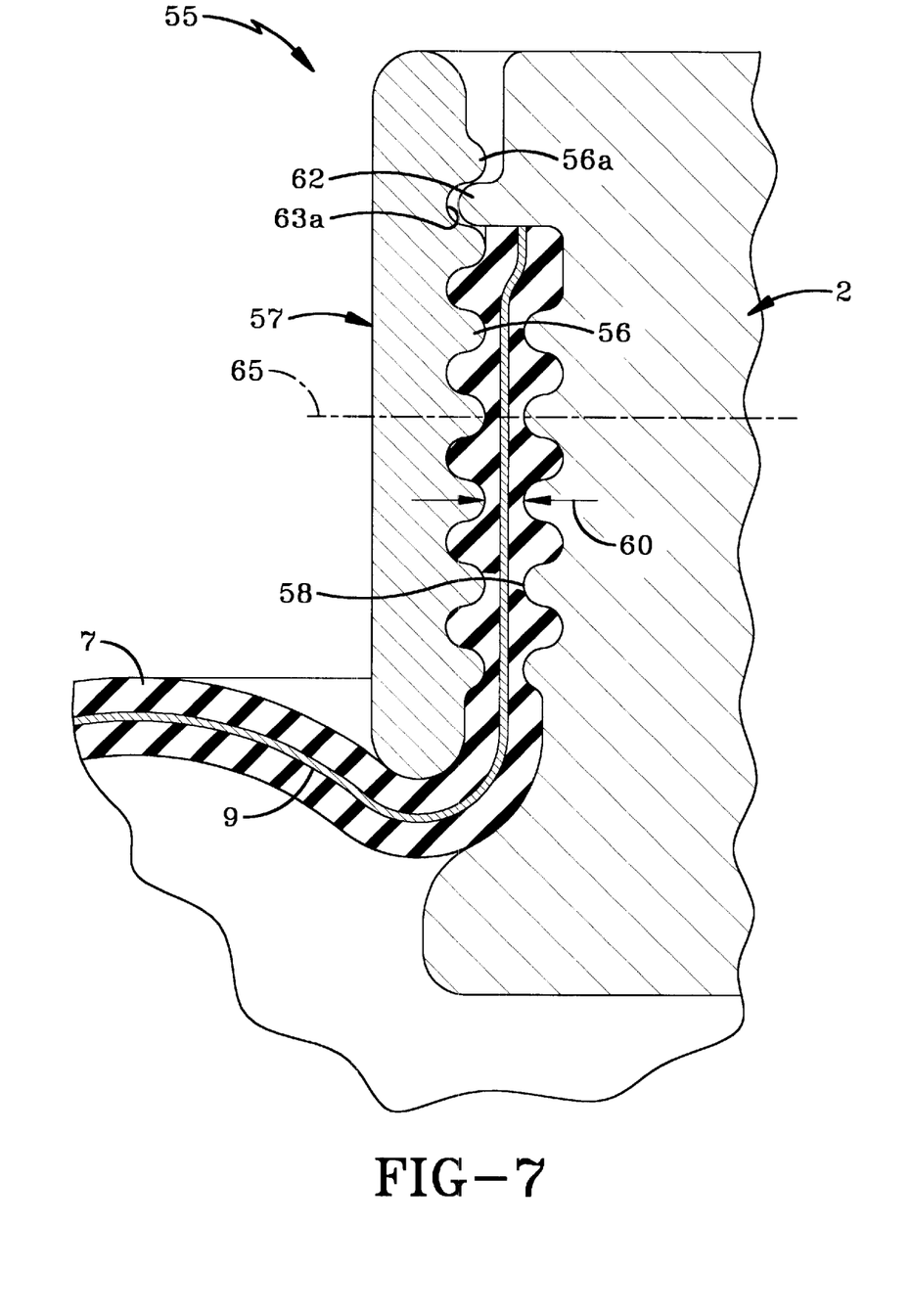
FIG. 7 is a view similar to FIG. 3 showing the modified assembly of FIG. 6 securing the sleeve against the sealing surface of the end cap.

A modified swage assembly 55 is shown in FIGS. 6 and 7. The main difference of this second embodiment is that the annular ribs 56 formed on swage ring 57 radially align with the opposed rounded ends of annular ribs 58 formed on end cap 2 and piston 3 instead of aligning with the opposed grooves as in the first embodiment. This provides a series of pinch or clamping areas 60 between the rib ends. Preferably the radial spacing between the opposed ribs defined by clamping areas 60, is greater than the diameter of reinforcing cords 9. This prevents excess squeezing of the elastomeric material trapped therebetween, yet will provide sufficient clamping pressure at each of the axially spaced areas 60 to form a fluid tight seal between swage ring 57 and the end members. Also, the rounded outer ends of the ribs may be larger than ribs 18 and 36 shown in FIGS. 2 and 3, so as to better distribute the clamping pressure on the elastomeric material squeezed therebetween and reduce the possibility of the outer rib ends cutting into the elastomeric material.

As in the first embodiment, swage ring 57 provides the critical feature of the positive mechanical interlock between the annular projections formed on the swage ring and on the piston and/or end cap, which interlock is free of any intervening elastomeric material, to prevent excessive axial movement of the swage ring with respect to the opposed sealing surface, especially when sleeve 7 moves to a greatly extended position as shown by the dashed positions 42 and 50.

This mechanical interlock is provided by the endmost rib 56a extending radially beyond a radial projection 61 and 62 formed on piston 3 or end cap 2, respectively, which projection extends into the adjacent endmost groove 63a of ring 57. Again, this locking engagement of mating projections is free of any intervening elastomeric material.

Again, swage ring 57 preferably is symmetrical with the ribs and grooves being similar on each side of its center axis 65. Likewise the ribs and grooves on end cap 2 and piston 3 preferably are similar so that swage ring 57 can be used for securing sleeve 7 to either the end cap or piston.

While the embodiments of the invention have been described, the invention is not limited thereto. The claims of the invention follow.

What is claimed is:

1. An air spring including:
   a) a pair of end members adapted to be mounted at spaced locations;
   b) a flexible sleeve formed of an elastomeric material having at least one open end sealingly engaged with one of the end members and forming a fluid chamber between said end members;
   c) a similar sealing surface formed on each of said end members, each of said sealing surface being formed with a plurality of spaced annular ribs and intervening grooves, said ribs extending outwardly from the sealing surface and terminating in outer ends;
   d) a radially outwardly extending first annular projection formed on each of the end members adjacent the sealing surface;
   e) an annular swage ring selectively located concentrically with respect to either of the sealing surfaces of said end members sealingly clamping the open end of the flexible sleeve therebetween, said swage ring having inner and outer surfaces extending between a pair of end surfaces, said inner surface being formed with plurality of spaced annular ribs and intervening grooves, said ribs extending radially inwardly from said inner surface toward the sealing surface of the said selected end member and cooperating with the ribs and recesses formed on said sealing surface to sealingly clamp the flexible sleeve therebetween; said swage ring further including an annular recess formed adjacent each end surface and a second annular projection formed on the inner surface of the swage ring adjacent at least one of the end surfaces; and
   f) said first annular projection of the selected end member being seated in one of the recesses formed in the swage ring and cooperating with the second projection formed on said swage to provide a mechanical interlock therebetween free of any intervening elastomeric material for retaining said swage ring in position adjacent the sealing surface of the selected end member and to restrict movement of said swage ring during operation of the air spring.

2. The air spring defined in claim 1 in which the ribs are spaced axially apart on the sealing surfaces of the said end members and on the swage ring and terminate in outer rounded ends.

3. The air spring defined in claim 2 in which the ribs of the swage ring radially align with opposed grooves formed in the sealing surfaces of said end members; and in which the ribs formed on the sealing surfaces of said end members radially align with opposed grooves formed on the swage ring.

4. The air spring defined in claim 1 in which the ribs formed on the sealing surfaces of the end members and on the swage ring terminate in outer ends which radially align with each other.

5. The air spring defined in claim 4 in which the elastomeric material contains reinforcing cords; and in which the radially aligned rib ends are spaced apart a greater distance than the thickness of the reinforcing cords.

6. The air spring defined in claim 1 in which the grooves formed on the swage ring have generally flat root surfaces.

7. The air spring defined in claim 1 in which there are at least four ribs formed on each of the sealing surfaces of the end members and the swage ring.

8. The air spring defined in claim 1 in which one of the end members is a piston having a body formed with an annular recess formed between the first annular projection and a curved corner; and in which the second annular projection of the swage ring seats in said annular recess of said piston body whereby the outer surface of the swage ring generally aligns with said curved corner of the piston to provide a substantially continuous surface on which the flexible sleeve may roll during operation of the air spring.

9. The air spring defined in claim 1 in which the end surfaces of the swage ring are smoothly curved.

10. The air spring defined in claim 1 in which the outer ends of the ribs of each of the sealing surfaces of the end members and swage ring are in radial alignment.

11. The air spring defined in claim 1 in which the swage ring is symmetrical with respect to a center axis of the end members; and in which two of said second annular projections are formed on said swage ring, each at an opposite end thereof.

12. The air spring defined in claim 1 in which the swage ring is metal and the end members are metal or plastic.

13. The air spring defined in claim 1 in which the elastomeric material of the said one open end of the elastomeric sleeve terminates adjacent the first annular projection of the said one end member.

* * * * *